United States Patent [19]

Agudelo et al.

[11] Patent Number: 5,204,757
[45] Date of Patent: Apr. 20, 1993

[54] FACSIMILE FRONT END ROUTER

[76] Inventors: G. William Agudelo, 426 Pleasant St., Malden, Mass. 02148; Shu-Kuang Ho, 56 Nowell Farme Rd., Carlisle, Mass. 01741

[21] Appl. No.: 639,796

[22] Filed: Jan. 10, 1991

[51] Int. Cl.⁵ .......................... H04N 1/00; H04M 1/27
[52] U.S. Cl. .................................... 358/444; 358/407; 379/100; 379/355
[58] Field of Search ............... 358/407, 444, 468, 442, 358/402; 379/211, 212, 100, 354-356; 370/61

[56] References Cited

U.S. PATENT DOCUMENTS

| | | | |
|---|---|---|---|
| 4,785,355 | 11/1988 | Matsumoto | 370/61 |
| 4,807,279 | 2/1989 | McClure et al. | 379/211 |
| 4,994,926 | 2/1991 | Gordon et al. | 358/407 |
| 5,014,300 | 5/1991 | Harvath et al. | 358/407 |
| 5,018,191 | 3/1991 | Catron et al. | 379/211 |
| 5,033,078 | 7/1991 | Andoh | 379/355 |

Primary Examiner—Edward L. Coles, Sr.
Assistant Examiner—Jill Jackson
Attorney, Agent, or Firm—Sylvia L. Boyd

[57] ABSTRACT

Facsimile data is routed from a transmitting device to a destination device. Responsive to detection at a first port of a received off-hook condition signal and of a set of destination identifying signals, a front-end router provides sequentially at a second port an off-hook signal, signals representing a stored telephone number of a store-and-forward service device, signals representing stored store-and-forward service access authorization information, signals representing the set of destination identifying signals, and a facsimile mode invoke signal. A communication path is enabled between the two ports. Data is transferred to the store-and-forward service through the router. Thereafter, responsive to detection at the first port of a received on-hook condition signal, an on-hook condition signal is provided at the second port.

7 Claims, 3 Drawing Sheets

FACSIMILE FRONT END ROUTER

This invention relates to transmission of information in facsimile document form.

Facsimile transmission and receiving devices have become standard equipment in many businesses. Such devices are so frequently used that a user desiring to transmit facsimile information to a destination machine commonly finds that the destination machine is busy, or inoperative (for example to refill the paper supply) or otherwise not responsive. Much time and energy is wasted when users must repeat attempts to transmit the information; the transmitting machine is tied up by such repetition and the line of intending users grows.

A "store and forward" service is offered by many sources. Such a service is typically remote, and connectable over a telephone line to a transmitting facsimile device. A facsimile device user or owner subscribes to such a service, and establishes with such service information, such as a password, which authorizes access to the service from the transmitting device. Thereafter a subscriber using the transmitting facsimile device dials the telephone number of the store-and-forward service (typically a 900 number) direct. Store-and-forward services generally maintain a large number of access lines, so that a connection is generally established without delay. The service responds, typically with a voice prompt requiring transmission of the previously established access-authorizing information. The transmitting user must key in such information. When the store-and-forward service grants access, the transmitting device user then must dial or key in the telephone number of the destination facsimile device. The facsimile data is then transmitted to the store-and-forward service, which stores the data and thereafter attempts transmission until the data goes through to the destination device. From the user's point of view, transmission is accomplished in a single effort and the device is free for other use.

This useful service occasions other problems. Not all facsimile machines include a handset for the keying in of log-on and password information. Further, considerable interaction is involved between the user and the store-and-forward service, requiring the user to remember or look up the log-on and password information, and to enter it accurately. Such information may be changed from time to time, requiring the user to be aware of updated information and have it available.

It would therefore be desirable to provide simplified access to such a store-and-forward service, which would appear from the user's point of view to be a simple direct transmission to the destination device.

SUMMARY OF INVENTION

It is an object of this invention to provide such simplified access, by providing a facsimile device front-end router.

According to the invention, a front-end router comprises a keypad, two communication ports, signal receive and transmit circuitry, signal detection circuitry, signal generator, and signal storage, all interconnected for the transmission of information among them. The router is responsive to signals input through the keypad representing the telephone number of a facsimile store-and-forward service device, to store a representation of the service device telephone number in the signal storage.

The router is responsive to signals input through the keypad representing access authorization information, to store a representation of the access authorization information in the signal storage.

The router is responsive to an off-hook condition signal received at a first communication port to provide at that port a dial tone signal, and to provide at the second communication port dialing signals representation of the stored service device telephone number. The router is responsive to receipt of a set of destination identifying signals (destination telephone number) at the first port to store a representation of the set in the signal storage.

The router responds to signals received at the second port indicating establishment of a connection to the store-and-forward service device to transmit at the second port signals representative of the stored access authorization information and of the stored set of destination identifying signals, and a fax mode invoke signal. The router is thereafter responsive to an on-hook signal received at the first port, to provide an on-hook signal at the second port.

REFERENCE TO THE DRAWINGS

DETAILED DESCRIPTION OF THE INVENTION

Figure 1:
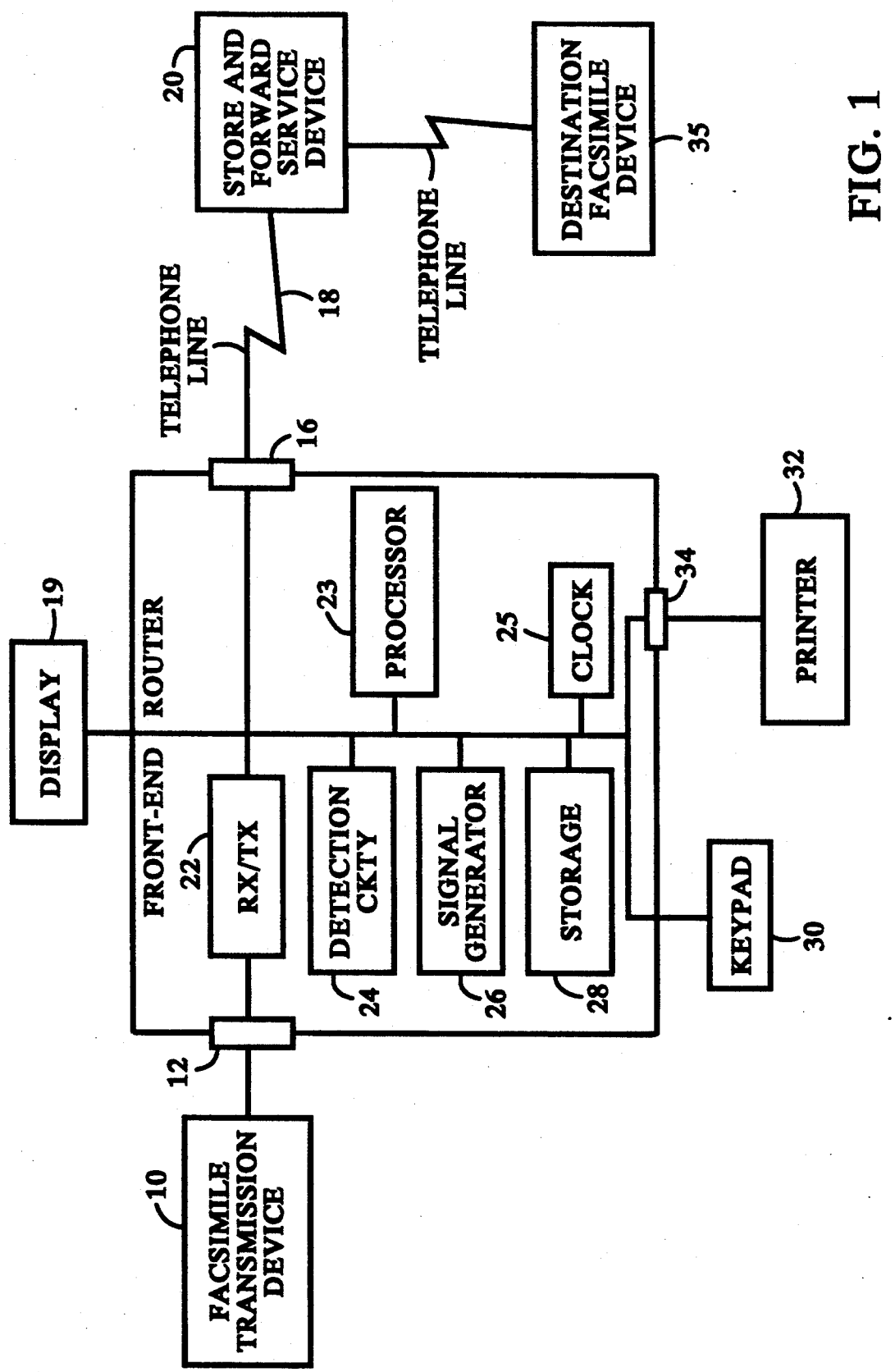
FIG. 1 is a block diagram of a facsimile device front-end router according to the invention.

Referring now to the drawing, and in particular to FIG. 1, a facsimile transmission device 10 is connected through a communication port 12 to a front-end router 14. Router 14 is connected through a second communication port 16 to a telephone line, or other standard analog or digital communication line suitable for the transmission of information either in facsimile form or using other communications protocols. A remote store-and-forward service device is connected to telephone line 18. Telephone line 18 is typically part of a network, such that device 20 must be dialed up to establish a connection.

Front-end router 14 comprises receive/transmit circuitry 22, processor 23, signal detection circuitry 24, signal generating circuitry 26, and signal storage 28, all connected together to permit transmission of information among the named elements. An external keypad is connected to the internal elements, and a printer 32 may be optionally connected to router 14 at printer port 34. A display 19 is provided.

After subscribing to a store-and-forward service, a user or owner of a facsimile transmission device 10 enters the telephone number of the store-and-forward service device 20 into router 14 through keypad 30, and a representation of this number is then stored in storage 28. The necessary access authorization information, such as log-on information and password, established with the store-and-forward service, is also entered into router 14 through keypad 30, and a representation of this information is stored in storage 28. The entered data, with any necessary prompts, are displayed at 19 for the convenience of the user.

Figure 2:
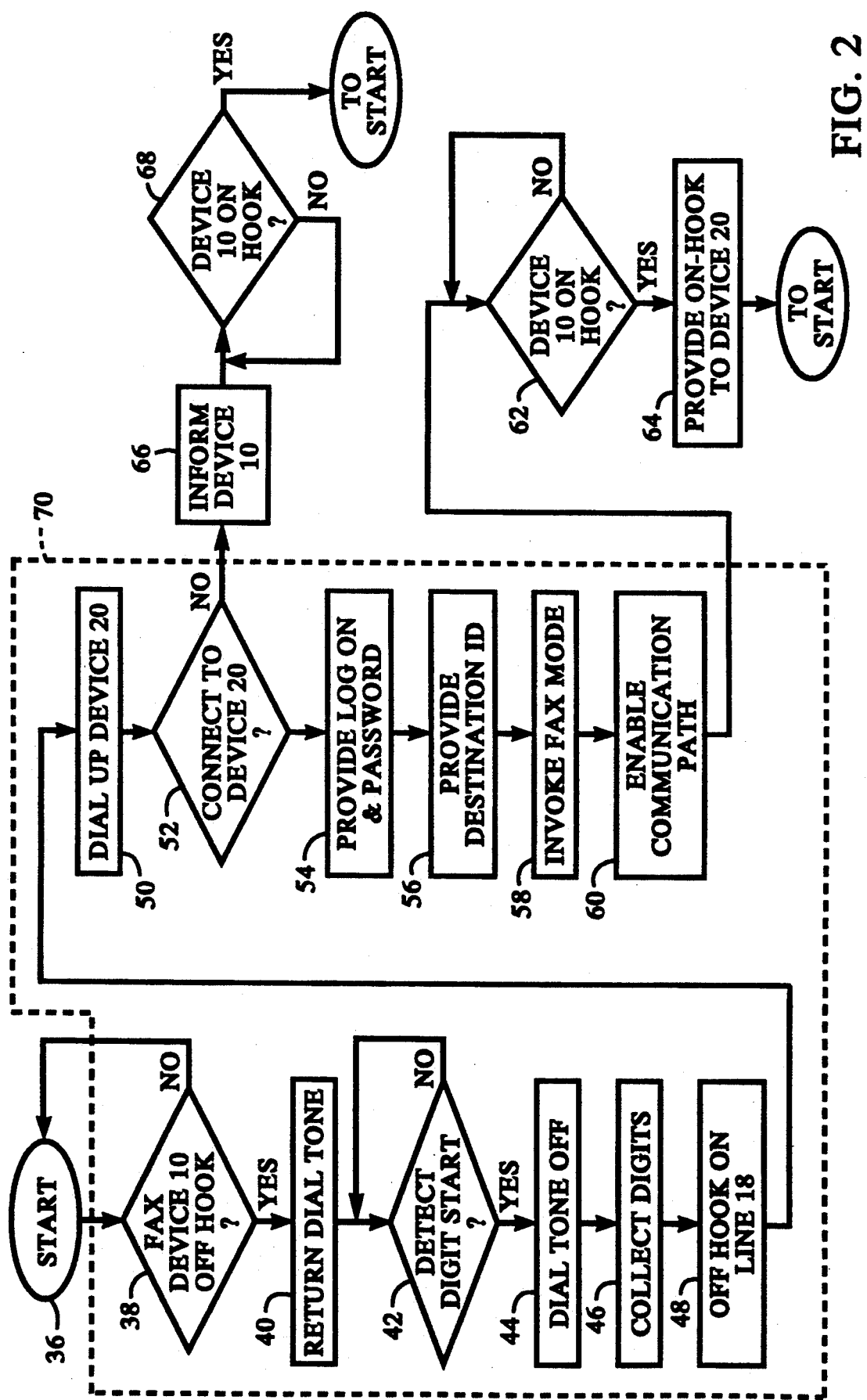
FIG. 2 is a flow-chart illustrating the operation of a facsimile device front-end router according to the invention.

Referring now to FIG. 2, in its waiting state (when not occupied with a transmission) router 14 maintains receptivity (38) to an off-hook condition signal from the connected facsimile transmission device 10. When such an off-hook condition signal is detected, router 14 responds by generating and transmitting to device 10 a dial tone signal (40). Thereafter router 14 maintains receptivity to the commencement of transmission from device 10 of the first digit of the telephone number of the destination facsimile device (35, FIG. 1) to which the transmitting user wishes to transmit (42, FIG. 2). When such commencement is detected, router 14 terminates transmission of the dial tone signal to device 10 (44) and begins to collect and store in storage 28 the complete set of destination identifying signals, including the first digit, comprising the telephone number of the destination facsimile device 35 (46).

Router 14 provides an off-hook signal on telephone line 18 (48). Upon detecting a dial tone on line 18, router 14, referring to storage 28, transmits over line 18 signals representing the store-and-forward device telephone number (50). These steps may be overlapped with the collection of the destination device telephone number. Router 14 waits for a predetermined time interval (or number of rings, as preferred) to receive signals indicating that a connection has been established on line 18 to service device 20 (52). When such signals are received, router 14, with reference to storage 28, responds by transmitting on line 18 signals representing the stored access authorization information required by the service device 20 (54). This operation may involve recognizing and responding to voice or other prompts received over line 18, depending on the operation of service device 20. Router 14 then transmits on line 18 signals representing the stored collected set of destination identifying signals, namely the telephone number of destination device 35 (56).

Thereafter router 14 transmits on line 18 a "fax mode invoke" signal (58), and then enables a communication path between transmission device 10 and line 18 (60). The store and forward device may respond with either a continuous answer tone, or an answer signal packet repeated throughout a time interval. In either case, the store-and-forward response continues long enough that after the communication path between device 10 and line 18 is enabled, the store-and-forward signal can be received by transmission device 10, where it functions as a start signal. The facsimile data is transmitted from device 10 to line 18. Router 14 maintains receptivity to an on-hook signal from device 10 (62). So long as the off-hook signal continues to be provided router 14 maintains such receptivity, but when an on-hook signal is detected, router 14 responds by providing an on-hook signal to line 18. Router 14 then reenters the state (38) of maintaining receptivity to an off-hook signal from device 10.

If at step 52 (FIG. 2) no connection is established to service device 20 within the predetermined time, router 14 transmits corresponding information signals to device 10 (66) and awaits an on-hook signal from device 10 to return to condition 38 (68).

Once the access authorization information and the telephone number of service device 20 have been stored at 28, the operations of router 14 as well as the store and forward service are transparent to the user of device 10. From the user's point of view, he dials the telephone number of destination device 35 and is promptly connected, forwards his facsimile data, and completes his communication without incident. Transfer to the store-and-forward device is confirmed in the usual manner; end-to-end confirmation may be returned by the store-and-forward device after delivery to the destination, either by facsimile to the transmitting device 10 or via a mailbox.

If a change is made in the store-and-forward service subscribed to, or if access authorization information or prompt sequence, or other feature of achieving connection to service device 20, is changed, storage 28 of router 14 is easily updated through keypad 30. The user of device 10 need not retain any of these changes in his own memory.

If desired, various restrictions may be stored in router 14: for example, certain destination telephone numbers may be labeled as invalid, such that router 14 will not complete a connection to service device 20 when such a destination number is provided. Alternatively, only certain destination numbers may be authorized as acceptable, such that router 14 will complete a connection to service device 20 only when such destination numbers are provided. Such restrictions might be used to prevent unauthorized private use of a company facsimile device.

Further, data on the usage of device 10 are easily compiled by router 14 and stored in storage 28: for example, all destination telephone numbers may be accumulated, or records of usage of device 10 according to time of day compiled, or other desired information. Such information can then be printed out on optional printer 32, as commanded by signals input through keypad 30.

The front-end router can be adapted to accommodate connections to additional transmission devices, by providing additional connections to telephone lines for transmission to the store-and-forward service device.

The front-end router of the invention may used with communications protocols other than facsimile. Further, the router may be used with communications lines other than public telephone lines. The terms "off-hook signal" and "on-hook signal" as used herein are considered to be generic to any signals, appropriate to the communications technology employed, which indicate respectively a request for communications service and a termination of communication.

Figure 3:
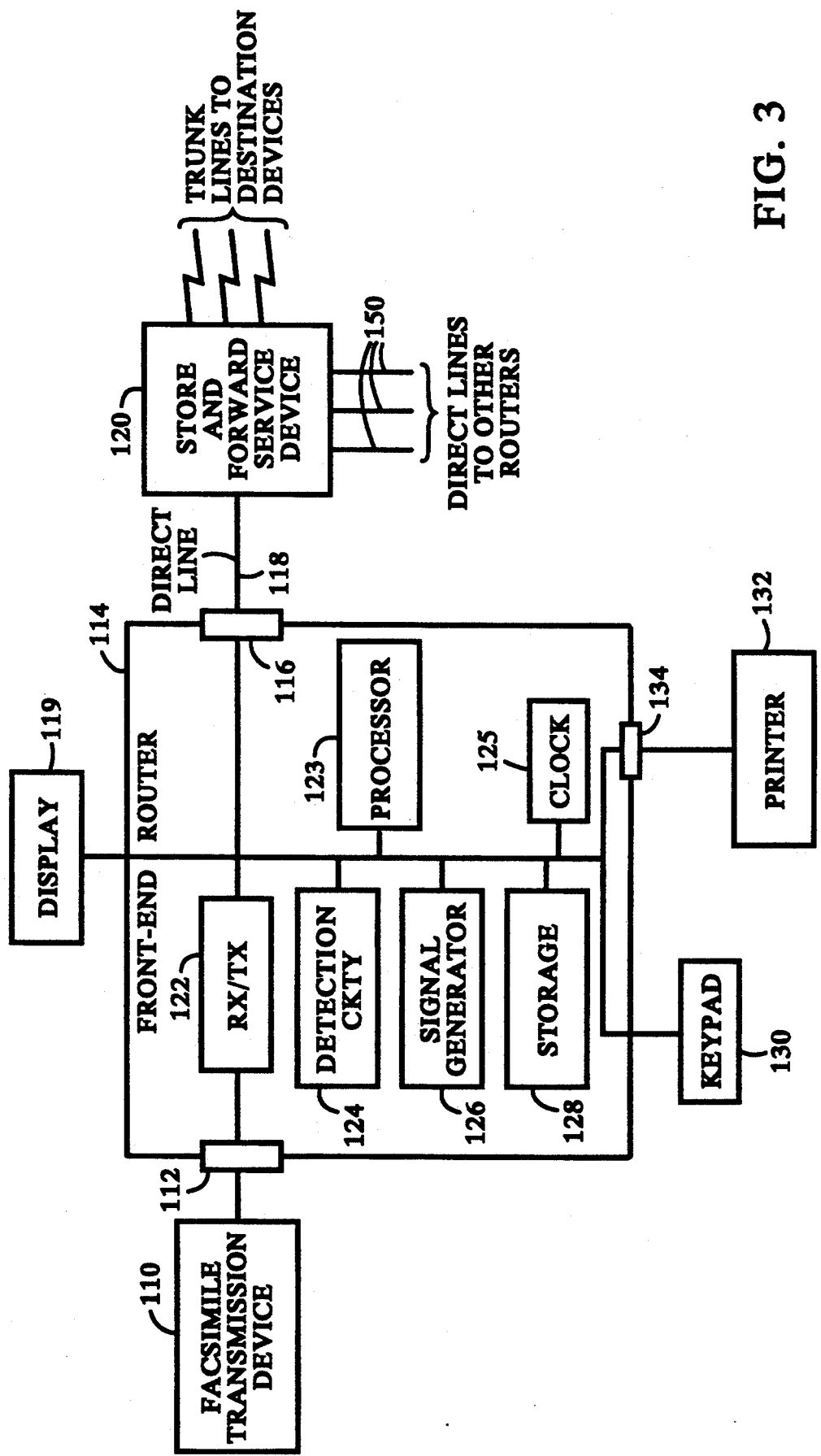
FIG. 3 is a block diagram of the front-end router of the invention in an alternative arrangement.

The front-end router may also be employed with a store-and-forward service device which is within the same building, or the same business premises, as the router. As seen in FIG. 3, a facsimile transmission device 110 is connected through a communication port 112 to a front-end router 114. Router 114 is connected through a second communication port 116 to a direct line 118 connected to a store-and-forward service device 120. No dial-up is required for connection.

Front-end router 114 comprises receive/transmit circuitry 122, processor 123, signal detection circuitry 124, signal generating circuitry 126, and signal storage 128, all connected together to permit transmission of information among the named elements. An external keypad is connected to the internal elements, and a printer 132 may be optionally connected to router 114 at printer port 134. A display 119 is provided.

The necessary access authorization information, such as log-on information and password, established with the store-and-forward service, is entered into router 114 through keypad 130, and a representation of this information is stored in storage 128. The entered data, with any necessary prompts, are displayed at 119 for the convenience of the user.

The operation of router 114 follows the steps shown in FIG. 2, except that step 50 (dial up store and forward device) is not required because the connection is made through a direct line. At step 48, router 114 signals to device 120 that it requests service; if no response is received indicating that a connection has been established within an appropriate time, the connection is dropped and the transmitting facsimile is informed. If connection is established, authorization information is provided as in the previously discussed operation, and operation proceeds as previously described.

Other similar routers may be connected by direct lines 150 to the service device 120, which is also connected to telephone trunk lines over which remote destination devices can be dialed up. Communications can also be directed to the facsimile devices connected through similar routers over direct lines 150 to device 120.

What is claimed is:

1. A facsimile front-end router, comprising
   a keypad, two communication ports, signal receive and transmit circuitry, signal detection circuitry, signal generator, and signal storage, all interconnected for the transmission of information among them,
   said router being responsive to signals input through said keypad representing a telephone number of a facsimile store-and-forward service device to store a representation of said service device telephone number in said signal storage,
   said router being responsive to signals input through said keypad representing access authorization information to store a representation of said access authorization information in said signal storage,
   said router being responsive to an off-hook condition signal received at a first said communication port to provide at said first communication port a dial tone signal, and to provide at the second said communication port dialing signals representative of said stored service device telephone number,
   said router being responsive to receipt of a set of destination identifying signals at said first communication port to store a representation of said signals in said identifying signal storage,
   said router being responsive to signals received at said second communication port indicating establishment of a connection to said store-and-forward service device to transmit at said second communication port signals representative of said stored access authorization information and of said stored set of destination identifying signals, and a fax mode invoke signal,
   said router being thereafter responsive to an on-hook signal received at said first communication port to provide an on-hook signal at said second communication port.

2. The front-end router of claim 1, further comprising a printer port, and being responsive to command signals input through said keypad to output at said printer port signals representative of information stored in said storage.

3. A method of connecting a facsimile transmission device to a facsimile store-and-forward service device, comprising the following steps:
   storing a representation of a telephone number of a facsimile store-and-forward service device,
   storing representations of log-on and password information for authorizing access by a facsimile transmission device to said facsimile store-and-forward service device,
   maintaining receptivity to an off-hook condition signal received from said facsimile transmission device,
   providing to said facsimile transmission device, responsive to a detected said off-hook condition signal, a dial tone signal,
   thereafter maintaining receptivity to commencement of receipt of a first destination identifying signal from said facsimile transmission device,
   terminating said dial tone signal responsive to detected said commencement,
   thereafter collecting and storing a set of destination identifying signals including said first destination identifying signal,
   providing an off-hook signal on a telephone line,
   transmitting over said telephone line, responsive to a dial tone received on said telephone line, signals representing said stored store-and-forward service device telephone number,
   transmitting on said telephone line, responsive to signals indicating establishment of a connection on said telephone line to said store-and-forward service device and to signals received from said service device, signals representing said stored log-on and password information and said stored collected set of destination identifying signals,
   transmitting a fax mode invoke signal on said telephone line,
   enabling a communication path between said facsimile transmission device and said telephone line,
   maintaining receptivity to an on-hook signal from said facsimile transmission device,
   providing an on-hook signal on said telephone line responsive to a detected said on-hook signal.

4. A method of routing transmitted facsimile data from a transmitting device to a destination device, comprising the following steps:
   responsive to detection at a first port of a received off-hook condition signal and of a set of destination identifying signals, providing sequentially at a second port an off-hook signal, signals representing a stored telephone number of a store-and-forward service device, signals representing stored store-and-forward service access authorization information, signals representing said set of destination identifying signals, and a fax mode invoke signal,
   enabling a communication path between said first and second ports, and
   responsive to detection at said first port of a received on-hook condition signal, providing an on-hook condition signal at said second port.

5. A communications front-end router, comprising
   a keypad, two communication ports, signal receive and transmit circuitry, signal detection circuitry, signal generator, and signal storage, all interconnected for the transmission of information among them,
   said router being responsive to signals input through said keypad representing a telephone number of a store-and-forward service device to store a representation of said service device telephone number in said signal storage,
   said router being responsive to signals input through said keypad representing access authorization information to store a representation of said access authorization information in said signal storage, said router being responsive to an off-hook condition signal received at a first said communication port to provide at said first communication port a dial tone signal, and to provide at the second said communication port dialing signals representative of said stored service device telephone number, said router being responsive to receipt of a set of destination identifying signals at said first communication port to store a representation of said signals in said signal storage, said router being responsive to signals received at said second communication port indicating establishment of a connection to said store-and-forward service device to transmit at said second communication port signals representative of said stored access authorization information and of said stored set of destination identifying signals, and a data transfer mode invoke signal, said router being thereafter responsive to an on-hook signal received at said first communication port to provide an on-hook signal at said second communication port.

6. A method of routing transmitted data from a transmitting device to a destination device, comprising the following steps:

responsive to detection at a first port of a received off-hook condition signal and of a set of destination identifying signals, providing sequentially at a second port an off-hook signal, signals representing a stored telephone number of a store-and-forward service device, signals representing stored store-and-forward service access authorization information, signals representing said set of destination identifying signals, and a data transfer mode invoke signal, enabling a communication path between said first and second ports, and responsive to detection at said first port of a received on-hook condition signal, providing an on-hook condition signal at said second port.

7. A facsimile front-end router, comprising a keypad, two communication ports, signal receive and transmit circuitry, signal detection circuitry, signal generator, and signal storage, all interconnected for the transmission of information among them, said router being responsive to signals input through said keypad representing access authorization information to store a representation of said access authorization information in said signal storage, said router being responsive to an off-hook condition signal received at a first said communication port to provide at said first communication port a dial tone signal, and to provide at the second said communication port signals requesting service from a facsimile store-and-forward service device, said router being responsive to receipt of a set of destination identifying signals at said first communication port to store a representation of said signals in said signal storage, said router being responsive to signals received at said second communication port indicating establishment of a connection to said store-and-forward service device to transmit at said second communication port signals representative of said stored access authorization information and of said stored set of destination identifying signals, and a fax mode invoke signal, said router being thereafter responsive to an on-hook signal received at said first communication port to provide an on-hook signal at said second communication port.

* * * * *